US007131121B2

(12) United States Patent
Krishna et al.

(10) Patent No.: US 7,131,121 B2
(45) Date of Patent: Oct. 31, 2006

(54) METHOD AND APPARATUS FOR LINKING CONVERTED APPLET FILES WITHOUT RELOCATION ANNOTATIONS

(75) Inventors: Ksheerabdhi Krishna, Cedar Park, TX (US); Tim Wilkinson, Berkeley, CA (US); Sylvain Prevost, Austin, TX (US); Yannick Burianne, Clamart (FR)

(73) Assignee: Axalto, Inc., Austin, TX (US)

( * ) Notice: Subject to any disclaimer, the term of this patent is extended or adjusted under 35 U.S.C. 154(b) by 722 days.

(21) Appl. No.: 09/992,558

(22) Filed: Nov. 14, 2001

(65) Prior Publication Data

US 2003/0093781 A1    May 15, 2003

(51) Int. Cl.
*G06F 9/44* (2006.01)
(52) U.S. Cl. .................................. 717/165; 719/332
(58) Field of Classification Search ................ 717/136, 717/162–167, 141–144; 713/2; 719/331, 719/332
See application file for complete search history.

(56) References Cited

U.S. PATENT DOCUMENTS

| 5,075,848 | A | * | 12/1991 | Lai et al. .................... 711/152 |
|---|---|---|---|---|
| 5,581,768 | A | * | 12/1996 | Garney et al. .............. 718/104 |
| 5,668,999 | A | * | 9/1997 | Gosling ....................... 717/126 |
| 6,026,485 | A | * | 2/2000 | O'Connor et al. .......... 712/226 |
| 6,338,160 | B1 | * | 1/2002 | Patel et al. .................. 717/139 |
| 6,496,910 | B1 | * | 12/2002 | Baentsch et al. ........... 711/165 |
| 6,779,732 | B1 | * | 8/2004 | Krishna et al. ............. 235/492 |
| 2001/0034818 | A1 | * | 10/2001 | May et al. .................. 711/151 |
| 2002/0093856 | A1 | * | 7/2002 | Baentsch et al. ........... 365/200 |
| 2003/0028686 | A1 | * | 2/2003 | Schwabe et al. ............ 709/332 |
| 2003/0042318 | A1 | * | 3/2003 | Krishna et al. ............. 235/492 |

FOREIGN PATENT DOCUMENTS

WO    WO 99/49392    9/1999
WOPCT/US 02/36394 ISR    11/2001

OTHER PUBLICATIONS

Ksheerabdhi Krishna, Michael Montgomery, "A Simple(r) Interface Distribution Mechanism for Java Card", Sep. 2000, Java Card Workshop 2000, Cannes, France.*
Michael Hind, "Pointer analysis: haven't we solved this problem yet?", Jun. 2001, Proceedings of the 2001 ACM SIGPLAN—SIGSOFT workshop on Program analysis for software tools and engineering, ISBN:1-58113-413-4, pp. 54-61.*

(Continued)

*Primary Examiner*—Tuan Dam
*Assistant Examiner*—J. Derek Rutten
(74) *Attorney, Agent, or Firm*—Pehr Jansson; Anderson & Jansson, LLP

(57) ABSTRACT

A smart card which includes a non-volatile read/write memory, a processor connected to the memory, and an installer module configured to cause the processor to receive computer code having method bodies into the memory, and further configured to cause the processor to perform a method for determining the instruction boundaries of the method bodies and resolving unresolved references within the method bodies. The method includes steps for examining each instruction for a forward jump instruction and a valid ending instruction, maintaining a farthest logical return pointer corresponding to the instruction for which the farthest forward jump instruction or the farthest valid ending instruction is detected, resolving unresolved references within a method body starting with the first instruction and ending with the instruction corresponding to the farthest logical return pointer, and terminating the examination of each instruction within a method body when the instruction under examination is beyond the instruction corresponding to the farthest logical return pointer.

74 Claims, 5 Drawing Sheets

OTHER PUBLICATIONS

Zhiqun Chen, "Java Card Technology for Smart Cards", Jun. 2000, Addison Wesley, ISBN 0-201-70329-7, Section 1.1 and Chapter 3.*

Lance, Untch, and Wahl, "Bytecode-based Java Program Analysis", 1999, '99 ACM Souteast Regional Conference.*

Lindholm and Yellin, "The Java Virtual Machine Specification Second Edition", 1999, Chapters 3 and 5.*

"Java Card 2.1 Virtual Machine Specification", 1999, Sun Microsystems, Chapters 1-3.*

JDC Tech Tips, "Getting Started with Javap", Aug. 2000, Sun Microsystems, accessed online on Sep. 13, 2004 at <http://java.sun.com/developer/TechTips/2000/tt0829.html>.*

Aho, Sethi, and Ullman, "Compilers: Principles, Techniques, and Tools", 1986, Addison-Wesley, ISBN 0-201-10088-6, Chapter 9.*

Tim Lindholm, Frank Yetlin. "The Java Virtual Machine Specification Second Edition", Apr. 1999, Sun Microsystems Inc., Palo Alto, CA, USA, pp. 120-123 XP-002269823.

"Java Card 2.1.1 Virtual Machine Specification" C.S. Dept. Univ. of Augsburg—May 18, 2000, Chapter 6 . . . (item 2 cont.) www.informatik.uni-augsberg.de/lehrsluehle/info1/lehre/ss03/javacard/javacard-2.1.1/JCVMSpec.pdf.

* cited by examiner

METHOD AND APPARATUS FOR LINKING CONVERTED APPLET FILES WITHOUT RELOCATION ANNOTATIONS

BACKGROUND

1. Field of the Present Invention

The present invention generally relates to the field of smart cards and more particularly to an improved smart card and method for determining the boundaries of method bodies within converted applet files loaded into a smart card.

2. History of Related Art

Most consumers are familiar with and use credit cards, debit cards, automatic teller machine (ATM) cards, stored value cards, and the like. For many types of transactions, however, the current trend is away from these types of cards and into a class of devices generally referred to as smart cards. A smart card is a plastic, credit-card sized card that includes an electronic device (chip) embedded in the card's bulk plastic. Rather than only employing a magnetic strip to store information, smart cards employ a microprocessor and a memory element embedded within the chip.

Because they have a chip, smart cards can be programmed to operate in a number of varied capacities such as stored value cards, credit cards, debit cards, ATM cards, calling cards, personal identity cards, critical record storage devices, etc. In these varied capacities, a smart card may be designed to use a number of different application programs. Smart cards are compliant with Standard 7816 Parts 1–10 of the International Organization for Standardization (ISO), which are incorporated by reference herein and referred to generally as "ISO 7816."

Initially, application program development for smart cards was essentially proprietary to the smart card manufacturers or the smart card issuers. Smart card application development has, however, evolved over recent years so that it is no longer proprietary. Through the adoption of open architectures for application development, it is now possible to develop applications that can run on smart cards from different manufacturers, on other devices for the storage of data (i.e., storage devices), or other resource constrained devices that, like smart cards, have small amounts of available memory. Java Card smart card technology is an example of one such open development architecture. It uses the Java™ programming language and employs the Java Card smart card runtime environment (JCRE). The JCRE conforms to ISO 7816 and defines a platform on which applications written in the Java programming language can run on smart cards and other resource-constrained devices. Applications written for the JCRE are referred to as applets and must conform with the Java Card 2.1 Virtual Machine Specification (as revised from time to time) published by Sun Microsystems, Inc., which is incorporated by reference herein and referred to generally as the "JCVM Specification."

The process of loading an applet onto a smart card for execution requires that the source code of the applet first be converted into a corresponding binary representation of the classes making up the applet. This corresponding binary representation is referred to as a CAP file (converted applet file) and is the file format in which applications are loaded onto smart cards utilizing the JCRE. The CAP file is typically loaded as a block of bytes occupying contiguous space in the non-volatile read/write memory of the smart card by an installer module located on the smart card.

A CAP file consists of a set of components each of which defines differing elements or aspects of the contents of the CAP file. One such component is the Method Component which defines each of the methods (i.e., procedures or routines associated with one or more classes) declared in the package that makes up the CAP file. The following are among the items included in the Method Component: (1) a size item which indicates the number of bytes in the Method Component, (2) a handler count item which indicates the number of exception handler entries in the exception handler array, (3) an exception handlers item which provides relevant information for each exception handler (including a starting offset and a length for indicating the range of bytecodes for which the exception handler is active (i.e., a "catch range") and further including the starting address of the exception handler), and (4) a methods item which defines each of the variable length methods (i.e., method bodies) declared in the package making up the CAP file with each such method body containing a method header followed by the bytecodes (i.e., instructions) that implement such method body. While each method header contains relevant information defining the requirements for the operand stack, associated parameters being passed to the method body, and local variables for the method body, the method header does not specify the size of the associated method body.

The bytecodes within each method body typically contain operands consisting of various symbolic or unresolved code references which must be resolved prior to execution. The process of resolving these particular operands is generally referred to as linking or resolution and involves looking-up the symbolic reference in a corresponding table present in memory (constant pool) or other storage device or calculating the unresolved relative code reference and replacing the reference with the actual memory address or an internally accessible symbolic reference at which the particular command, function, definition, etc. is stored. The terms "resolve," "resolution," "resolving," and "linking" are used throughout to broadly describe the foregoing process of replacing the unresolved code or symbolic reference within the code or data structure with an internally accessible symbolic reference or actual memory address.

One method utilized by the prior art to implement the resolution process is to access a list of bytecode offsets into each method body, which list designates the applicable bytecodes within each method body requiring resolution (i.e., relocation annotations). This list of bytecode offsets is provided in the form of another component in the CAP file referred to as the Reference Location Component. The Reference Location Component is required by the prior art because the boundaries of each method body (i.e., the beginning and the end of each method body) are not specified in the Method Component. The Reference Location Component is used solely for the resolution process and is not referenced by any other component in a CAP file.

A second method utilized by the prior art to implement the resolution process without accessing the list of relocation annotations contained in the Reference Location Component is to access information contained in another component of the CAP file referred to as the Descriptor Component. The Descriptor Component contains sufficient information to permit parsing and verification of all elements of the CAP file. Consequently, the Descriptor Component contains information on the boundaries of each method body so as to permit parsing and examination of the bytecodes contained within each method body. Because of its lengthy size, however, the Descriptor Component is an optional component of the CAP file, and as such, is not always available.

It would be beneficial to implement an apparatus and method for the efficient linking of CAP files that does not rely upon relocation annotations (such as those provided in the Reference Location Component), but rather which enables the contiguous bytecodes making up the methods item of the Method Component to be examined (and if necessary, their operands resolved) without reliance upon the Descriptor Component.

BRIEF DESCRIPTION OF THE DRAWINGS

The structure and operation of the invention will become apparent upon reading the following detailed description and upon reference to the accompanying drawings in which.

Figure 1:
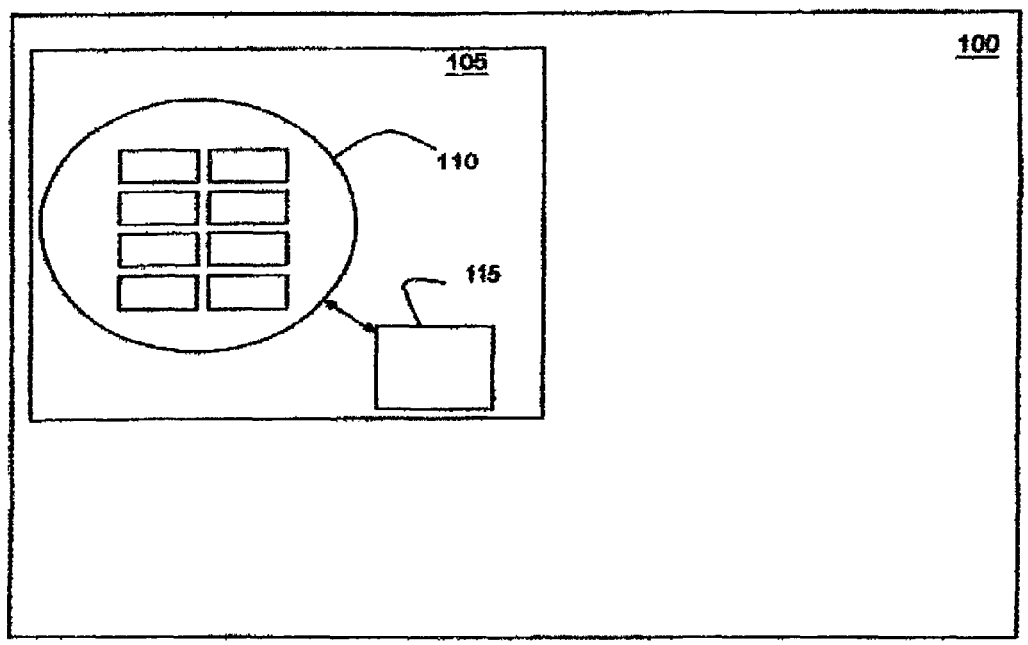
FIG. 1 shows an exemplary smart card.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

Generally speaking the present invention contemplates a smart card and method in which the smart card may be configured to receive computer code such as converted applet files with unresolved references within the method bodies for such files and examine each bytecode within the method bodies (and if applicable, resolve their operands) in a sequential manner and without relying upon relocation annotations such as those provided in a Reference Location Component. Throughout the description and the drawings, elements which are the same will be accorded the same reference numerals.

FIG. 1 shows an exemplary smart card. Smart card 100 is roughly the size of a credit card and includes a module 105 with conductive contacts 110 connected to a microprocessor with an integral memory element 115. Conductive contacts 110 interface with a terminal to typically provide operating power and to electrically transfer data between the terminal and the smart card. Other embodiments of a smart card may not include conductive contacts 110. Such "contactless" smart cards may exchange information and may receive power via proximately coupling, such as magnetic coupling, or via remote coupling, such as radio communication. Smart card 100 is compliant with ISO 7816.

Figure 2:
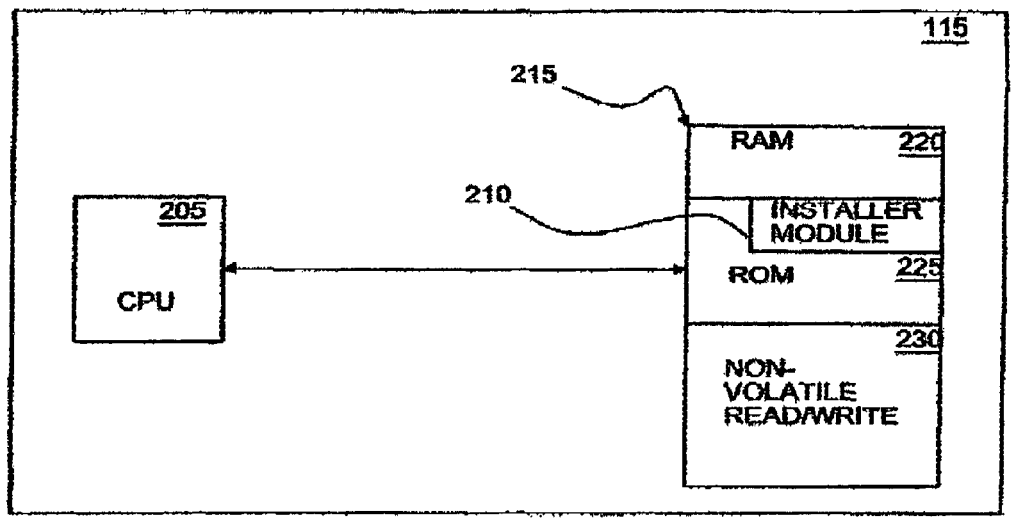
FIG. 2 conceptually illustrates the microprocessor with integral memory element 115 portion of module 105 of the exemplary smart card of FIG. 1 in some additional detail.

The microprocessor with an integral memory element 115 of FIG. 1 is shown in additional detail in FIG. 2. Microprocessor 115 includes central processing unit (CPU) 205. Microprocessor 115 is associated with a memory element 215. The "memory" may be formed on the same integrated circuit as microprocessor 115 or may be formed on a separate device.

Generally, the memory element 215 may be configured to include random access memory (RAM) 220, read only memory (ROM) 225, and non-volatile read/write memory 230. Read only memory 225 may be configured to include installer module 210. In an alternative configuration, RAM 220, ROM 225, and non-volatile read/write memory 230 are not located in the same memory element 215, but rather, in some combination of separate electronic units.

Figure 3:
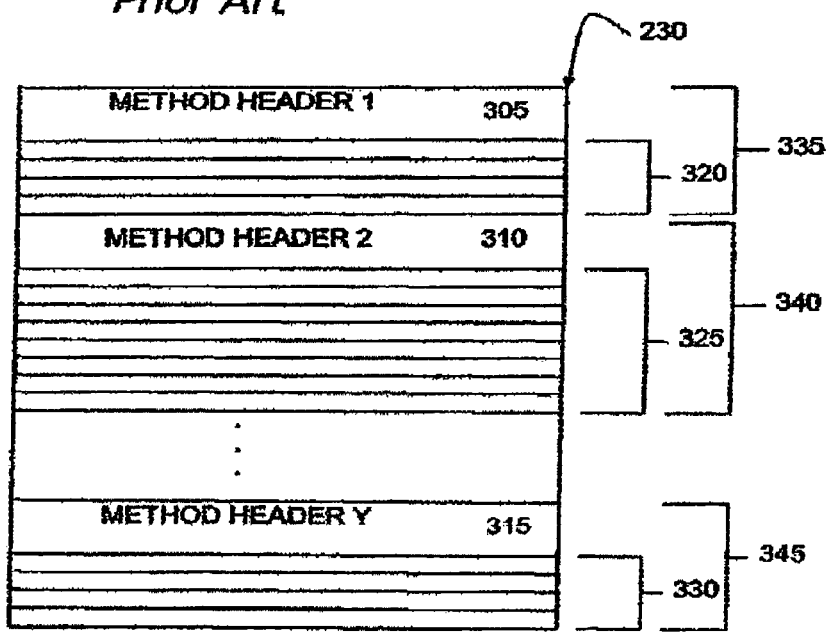
FIG. 3 conceptually illustrates a portion of non-volatile read/write memory 230 loaded with the method bodies for a Method Component.

FIG. 3 conceptually illustrates a portion of non-volatile read/write memory 230 loaded with variable length method bodies 1 335, 2 340, and Y 345 of the Method Component for a CAP file loaded into non-volatile read/write memory 230 by installer module 210. Method Headers 1 305, 2 310, and Y 315 contain relevant information for method bodies 1 335, 2 340, and Y 345, respectively. Further, the bytecodes for method bodies 1 335, 2 340, and Y 345, are depicted by 320, 325, and 330, respectively.

Figure 4:
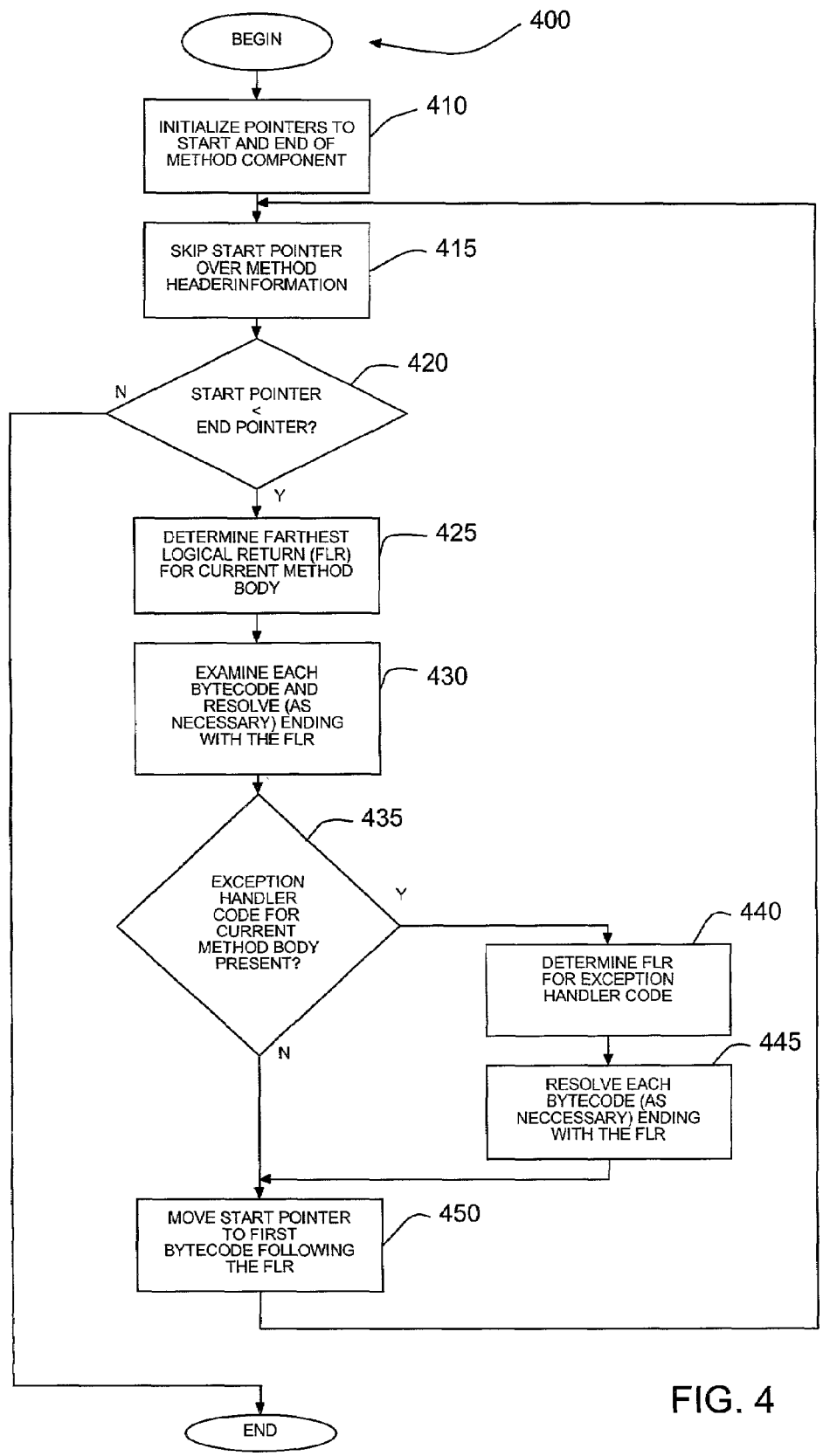
FIG. 4 is a flowchart further illustrating one aspect of the present invention.

FIG. 4 depicts a flow diagram illustrating an embodiment of a method 400 of the present invention. The embodiment generally involves examining each of the bytecodes making up the methods item of the Method Component, determining the starting point and ending point of the bytecodes containing instructions for each method body (including applicable exception handler code), and resolving each of the instruction bytecodes containing operands requiring resolution. In the depicted embodiment, using the applicable size information from the Method Component, a Start Pointer and an End Pointer are set to the start (i.e., method header of the first method body) and to the end of the Method Component, respectively 410. Using relevant size information from the method header of the applicable method body, the Start Pointer is incremented to the first bytecode of the applicable method body 415. A determination is made as to whether the Start Pointer is less than the End Pointer 420. If the Start Pointer is less than the End Pointer (i.e., the end of the Method Component has not been reached), then the farthest logical return ("FLR") for the applicable method body (i.e., end of the method body) is determined 425 and each bytecode up to and including the FLR is examined and its corresponding operands resolved as necessary 430.

The exception handler array is then examined to determine if one or more exception handler items are present for the bytecode range of the applicable method body 435. If an exception handler item for the bytecode range of the applicable method body is present, then the FLR for the exception handler item (i.e., end of the exception handler) is determined 440 and if the FLR for the exception handler code is greater than the previously determined FLR (i.e., the exception handling code is contained at the end of the method body), each bytecode up to and including the FLR for the exception handling code is examined and its corresponding operands resolved as necessary 445. If an exception handler item for the bytecode range of the applicable method body is not present or (if applicable) following the determination of the FLR for the exception handler item and resolution of applicable bytecode operands for the exception handler item, the Start Pointer is incremented to the first bytecode following the FLR 450 (which will be a method header if a subsequent method body follows), the Start Pointer is skipped over the method header 415, and the Start Pointer is once again examined to determine if it is less than the End Pointer 420. If the Start Pointer is equal to or greater than the End Pointer 420, then the bytecodes in each of the method bodies of the Method Component have been traversed and resolved (where applicable) and the process is completed.

Figure 5:
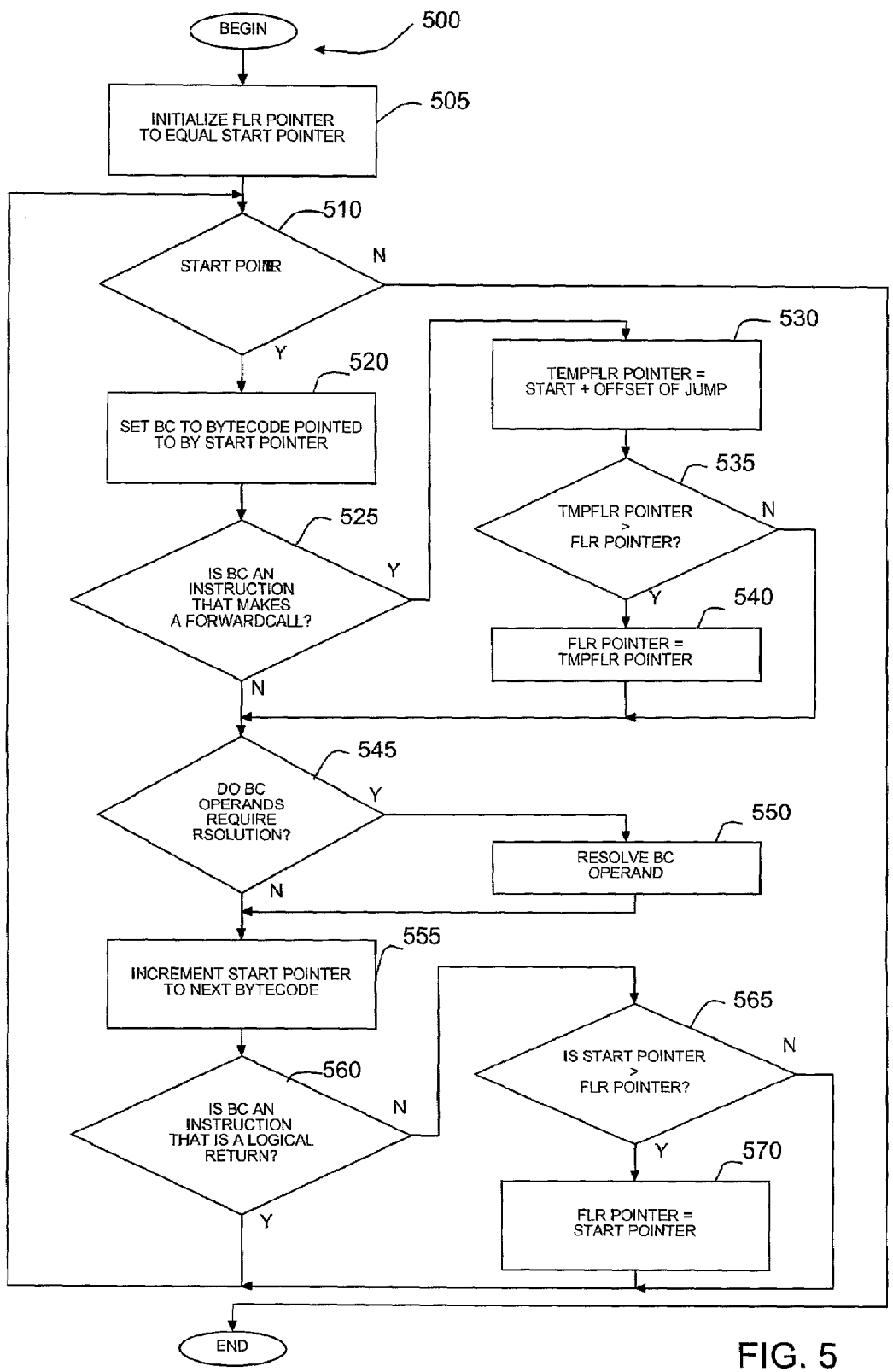
FIG. 5 is a flowchart further illustrating one embodiment for determining the farthest logical return and resolving applicable relocation references depicted in FIG. 4.

FIG. 5 depicts a flow diagram illustrating an embodiment of a method 500 for determining the FLR for the current method body and for resolving the operands (where required) for each bytecode of the current method body as depicted in items 425, 430, 440, and 445 of FIG. 4.

Upon entering the method, a FLR Pointer is set to equal the Start Pointer 505. As noted in the detailed description for FIG. 4 above, the Start Pointer is pointing to the first bytecode following the method header of the applicable method body. A determination is then made as to whether the Start Pointer is less than or equal to the FLR Pointer 510. If the Start Pointer is less than or equal to the FLR Pointer, then a BC Pointer is set to point to the bytecode currently pointed to by the Start Pointer 520.

A determination is made as to whether the bytecode pointed to by the BC Pointer is of a type that makes a forward call (i.e., forward jump instruction) 525. It will be apparent to those skilled in the art that the instructions in the JCVM Specification having a hexadecimal opcode value of 60–70, 73, 75, and 98–A8 are illustrative of bytecode types making a forward call. If the bytecode pointed to by the BC Pointer is of a type that makes a forward call, a temporary FLR Pointer is set to the location of the forward call 530. A determination is then made as to whether the temporary FLR Pointer is greater than the current FLR Pointer 535. If so, a logical return for the method body that is farther than the current FLR has been located and the FLR Pointer is set to equal the temporary FLR Pointer 540.

Following the examination as to whether the temporary FLR Pointer is greater than the current FLR Pointer (and if applicable setting the FLR Pointer to equal the temporary FLR Pointer), the bytecode pointed to by the BC Pointer is examined to determine if the applicable operand(s) require resolution 545. If the applicable operand(s) require resolution, then the bytecode pointed to by the BC Pointer is resolved 550. Following the examination (and applicable resolution) of the bytecode pointed to by the BC Pointer, the Start Pointer is incremented to the next bytecode 555.

A determination is then made as to whether the bytecode pointed to by the BC Pointer is a logical return (i.e., valid ending instruction) 560. It will be apparent to those skilled in the art that the instructions in the JCVM Specification having a hexadecimal opcode value of 70, 77–7A, 93, A8 are illustrative of bytecode types that are a logical return. If the bytecode pointed to by the BC Pointer is not a logical return, then a determination is made as to whether the Start Pointer is greater than the FLR Pointer 565. If the Start Pointer is greater than the FLR Pointer 565, then the FLR Pointer is set to equal the Start Pointer 570.

If the bytecode pointed to by the BC Pointer is a logical return or (if applicable) following examination of the Start Pointer and (if applicable setting of the FLR Pointer to equal the Start Pointer), the Start Pointer is once again examined to determine if it is less than or equal to the FLR Pointer 510. If the Start Pointer is greater than the FLR Pointer 510, the FLR for the current method body (other than applicable exception handling code) has been determined, each bytecode up to and including the FLR has been examined (and if necessary, its operands resolved), and the process completed.

Figure 6:
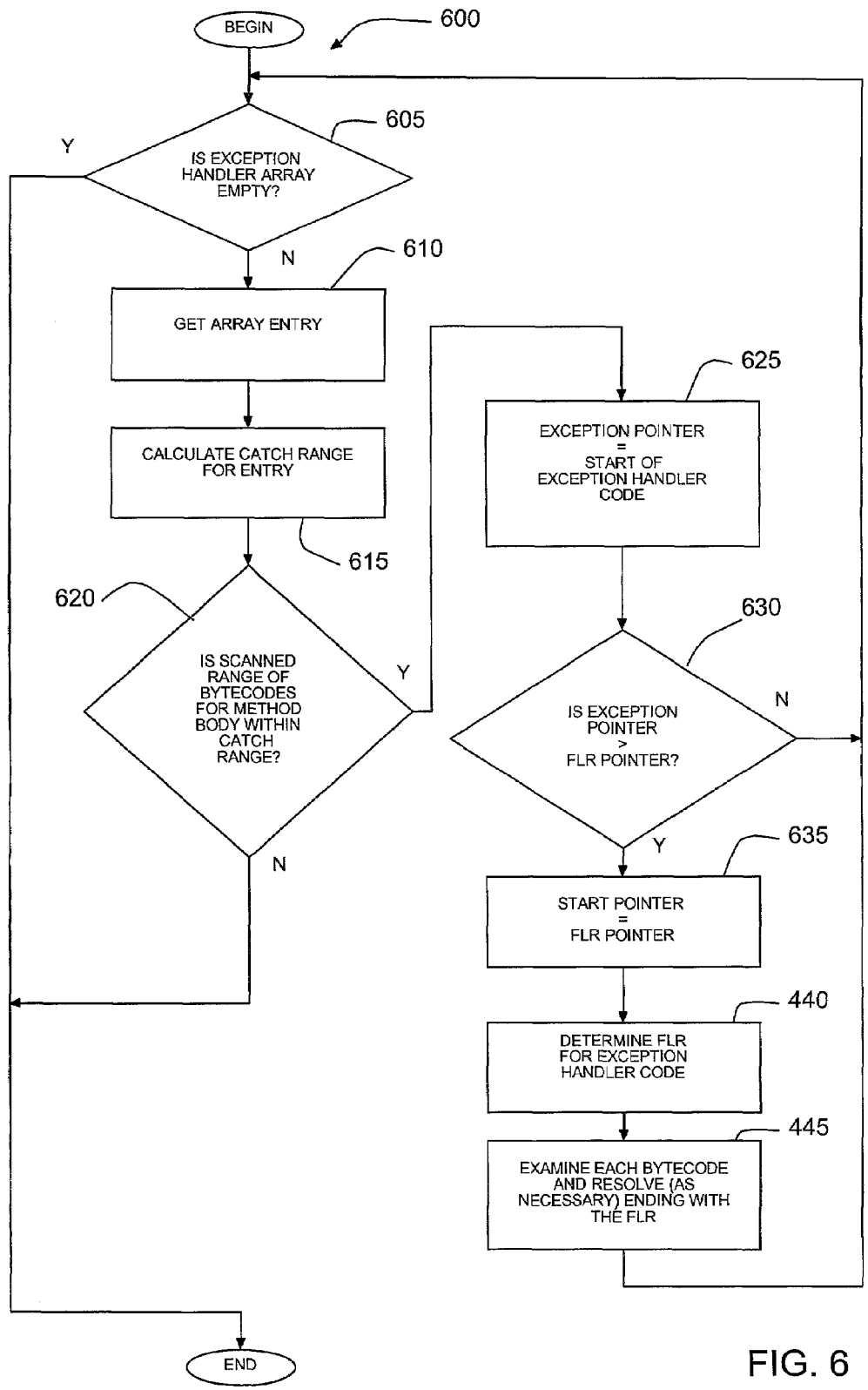
FIG. 6 is a flowchart further illustrating one embodiment for examining the exception handler code depicted in FIG. 4.

FIG. 6 depicts a flow diagram illustrating an embodiment of a method 600 for determining if exception handling code is present for the current method body as depicted in item 435 of FIG. 4 and if so, for determining the FLR for the exception handling code and for resolving the operands (where applicable) for each bytecode of the exception handling code as depicted in items 440 and 445 of FIG. 4. Upon entering the process, a determination is made as to whether the exception handler array for the Method Component is empty 605. If the exception handler array is not empty, the following process is conducted for each entry in the exception handler array: the catch range for the entry is determined 615 and a determination is made as to whether the bytecodes for the current method body just examined are within the catch range 620. If the bytecodes for the current method body just examined are within the catch range of the applicable exception entry, an Exception Pointer is set to the start of the applicable exception handler code for the applicable exception entry 625 and a determination is made as to whether the Exception Pointer is greater than the FLR Pointer 630. If the Exception Pointer is greater than the FLR Pointer, then exception handling code exists for the current method body beyond the existing FLR and the FLR for the exception handling code is determined and each bytecode of the exception handling code up to and including the FLR is examined (and if necessary, its operands resolved) 440 and 445, respectively.

The process depicted in FIG. 6 is complete if the exception handler array is empty 605 or (if applicable) following the examination of each entry in the exception handler array to determine whether the bytecodes for the current method body just examined are within the catch range of the applicable entry 620.

It should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium.

As introduced above, the term "smart card" was described with reference to the device shown in FIG. 1. While this example serves well for the explanations which followed, it should be noted that the present invention is broadly applicable to a class of resource-constrained devices having physical form factors which are different from the one illustrated in the example. For example, the present invention is readily adapted to Secure Interface Modules (SIMs) and Secure Access Modules (SAMs). SIMs and SAMs are physically smaller versions of the typical smart card and are typically used within telephones or other small spaces. The size, shape, nature, and composition of the material encapsulating or mounting the microprocessor and memory element are not relevant or limiting to the present invention. Thus, as used throughout, the term "smart card" is to be broadly read as encompassing any self-contained combination of microprocessor and memory element capable of performing a transaction with another device referred to as a terminal.

A person skilled in the art will appreciate that there are many alternative implementations of the invention described and claimed herein. For example, the embodiments described use various pointers, e.g., the Start, End, FLR, BC, and Exception Pointers. These pointers may be implemented using pointer data types provided by many programming languages and operating systems. Alternatively, they may be implemented as offsets from given locations. For example, in the latter alternative, a base location may be set at the start of a method body. Each of the pointers may then be implemented as offsets from that base location. Thus, the word "pointer" herein connotes a data element that provides a way, function, and result of specifying a location in a program or data structure so that access can be made to the content at that location thereby allowing examination, comparisons, or other operations involving that content.

It will be apparent to those skilled in the art having the benefit of this disclosure that the present invention contemplates a smart card and method for the efficient linking of computer code that does not rely upon relocation annotations. It is understood that the forms of the invention shown and described in the detailed description and the drawings are to be taken merely as presently preferred examples and that the invention is limited only by the language of the claims.

What is claimed is:

1. A method for determining instruction boundaries of at least one method body within a computer code loaded into a memory of a smart card comprising:
   a) examining in a sequential manner each instruction of the at least one method body starting with a first instruction of the at least one method body for an instruction selected from a group consisting of a forward jump instruction and a valid ending instruction;
   b) maintaining a Farthest Logical Return (FLR) Pointer corresponding to the instruction of the at least one method body for which the farthest forward jump instruction or the farthest valid ending instruction is detected;
   c) terminating the examining for a forward jump or a valid ending instruction when the instruction under examination is beyond the instruction corresponding to the FLR Pointer; and
   d) resolving each unresolved reference in each instruction of the at least one method body starting with the first instruction of the at least one method body and ending with the instruction corresponding to the FLR Pointer.

2. The method of claim 1 further comprising:
   d) setting a Start Pointer to a next method body of the at least one method body following the instruction corresponding to the FLR Pointer.

3. The method of claim 2 wherein each of the steps a), b), c), and d) are performed on each of a successive method bodies of the at least one method body.

4. The method of claim 1 further comprising:
   e) setting a Start Pointer to a next method body of the at least one method body following the instruction corresponding to the FLR Pointer.

5. The method of claim 4 wherein each of the steps a), b), c), d), and e) are performed on each of a successive method bodies of the at least one method body.

6. The method of claim 1 further comprising:
   d) determining if an exception handler code corresponding to the at least one method body is present; and
   a) responsive to determining that an exception handler code corresponding to the at least one method body is present beyond the instruction corresponding to the FLR Pointer:
      (i) examining in a sequential manner each instruction of the exception handler code corresponding to the at least one method body starting with a first instruction of the exception handler code corresponding to the at least one method body for an instruction selected from a group consisting of a forward jump instruction and a valid ending instruction;
      (ii) maintaining a FLR Pointer corresponding to the exception handler code corresponding to the at least one method body for which the farthest forward jump or the farthest valid ending instruction is detected; and
      (iii) terminating the examining for a forward jump or a valid ending instruction when the instruction under examination is beyond the instruction corresponding to the FLR Pointer.

7. The method of claim 6 further comprising:
   f) setting a Start Pointer to a next method body of the at least one method body following the instruction corresponding to the FLR Pointer.

8. The method of claim 7 wherein each of the steps a), b), c), d), e), and f) are performed on each of a successive method bodies of the at least one method body.

9. The method of claim 6 further comprising:
   f) resolving each unresolved reference in each instruction of the exception handler code corresponding to the at least one method body starting with the first instruction of the exception handler code corresponding to the at least one method body and ending with the instruction corresponding to the FLR Pointer.

10. The method of claim 9 further comprising:
    g) setting a Start Pointer to a next method body of the at least one method body following the instruction corresponding to the FLR Pointer.

11. The method of claim 10, wherein each of the steps a), b), c), d), e), f), and g) are performed on each of a successive method bodies of the at least one method body.

12. The method of claim 6 wherein determining if an exception handler code corresponding to the at least one method body is present includes:
    (i) determining if an exception entry is available in an exception handler array corresponding to the computer code;
    (ii) responsive to determining that an exception entry is available, determining a catch range for the exception entry; and
    (iii) determining if any of the instructions of the at least one method body starting with the first instruction of the at least one method body and ending with the instruction corresponding to the FLR Pointer are within the catch range.

13. The method of claim 1 wherein the computer code comprises a methods item of a method component of a converted applet file.

14. The method of claim 1 wherein the memory comprises non-volatile read/write memory.

15. A computer-readable medium tangibly having a program of machine-readable instructions for causing a processor to perform a method for determining instruction boundaries of at least one method body within a computer code loaded into a memory of a smart card, the method comprising:
    a) examining in a sequential manner each instruction of the at least one method body starting with a first instruction of the at least one method body for an instruction selected from a group consisting of a forward jump instruction and a valid ending instruction;
    b) maintaining a Farthest Logical Return (FLR) Pointer corresponding to the instruction of the at least one method body for which the farthest forward jump instruction or the farthest valid ending instruction is detected;
    c) terminating the examining for a forward jump or a valid ending instruction when the instruction under examination is beyond the instruction corresponding to the FLR Pointer; and
    d) resolving each unresolved reference in each instruction of the at least one method body starting with the first instruction of the at least one method body and ending with the instruction corresponding to the FLR Pointer.

16. The computer-readable medium of claim 15 further having instructions for causing a processor to perform a method, the method comprising:
   d) setting a Start Pointer to a next method body of the at least one method body following the instruction corresponding to the FLR Pointer.

17. The computer-readable medium of claim 16 further having instructions for causing a processor to perform each of the steps a), b), c), and d) on each of a successive method bodies of the at least one method body.

18. The computer-readable medium of claim 15 further having instructions for causing a processor to perform a method, the method comprising:
   e) setting a Start Pointer to a next method body of the at least one method body following the instruction corresponding to the FLR Pointer.

19. The computer-readable medium of claim 18 further having instructions for causing a processor to perform each of the steps a), b), c), d), and e) on each of a successive method bodies of the at least one method body.

20. The computer-readable medium of claim 15 further having instructions for causing a processor to perform a method, the method comprising:
   d) determining if an exception handler code corresponding to the at least one method body is present; and
   e) responsive to determining that an exception handler code corresponding to the at least one method body is present beyond the instruction corresponding to the FLR Pointer:
      (i) examining in a sequential manner each instruction of the exception handler code corresponding to the at least one method body starting with a first instruction of the exception handler code corresponding to the at least one method body for an instruction selected from a group consisting of a forward jump instruction and a valid ending instruction;
      (ii) maintaining a FLR Pointer corresponding to the exception handler code corresponding to the at least one method body for which the farthest forward jump or the farthest valid ending instruction is detected; and
      (iii) terminating the examining for a forward jump or a valid ending instruction when the instruction under examination is beyond the instruction corresponding to the FLR Pointer.

21. The computer-readable medium of claim 20 further having instructions for causing a processor to perform a method, the method comprising:
   f) setting a Start Pointer to a next method body of the at least one method body following the instruction corresponding to the FLR Pointer.

22. The computer-readable medium of claim 21 further having instructions for causing a processor to perform each of the steps a), b), c), d), e), and f) on each of a successive method bodies of the at least one method body.

23. The computer-readable medium of claim 20 further having instructions for causing a processor to perform a method, the method comprising:
   f) resolving each unresolved reference in each instruction of the exception handler code corresponding to the at least one method body starting with the first instruction of the exception handler code corresponding to the at least one method body and ending with the instruction corresponding to the FLR Pointer.

24. The computer-readable medium of claim 23 further having instructions for causing a processor to perform a method, the method comprising:
   g) setting a Start Pointer to a next method body of the at least one method body following the instruction corresponding to the FLR Pointer.

25. The computer-readable medium of claim 24 further having instructions for causing a processor to perform each of the steps a), b), c), d), e), f), and g) on each of a successive method bodies of the at least one method body.

26. The computer-readable medium of claim 20 wherein the instructions for determining if an exception handler code corresponding to the at least one method body is present includes instructions for causing a processor to perform a method, the method comprising:
   (i) determining if an exception entry is available in an exception handler array corresponding to the computer code;
   (ii) responsive to determining that an exception entry is available, determining a catch range for the exception entry; and
   (iii) determining if any of the instructions of the at least one method body starting with the first instruction of the at least one method body and ending with the instruction corresponding to the FLR Pointer are within the catch range.

27. A smart card configured to receive computer code having at least one method body within the computer code comprising:
   a memory;
   a processor connected to the memory; and
   an installer module having logic operable to cause the processor to receive the computer code into the memory; and further having logic operable to cause the processor to determine instruction boundaries within the computer code by a) examining in a sequential manner each instruction of the at least one method body starting with a first instruction of the at least one method body for an instruction selected from a group consisting of a forward jump instruction and a valid ending instruction; b) maintaining a Farthest Logical Return (FLR) Pointer corresponding to the instruction of the at least one method body for which the farthest forward jump instruction or the farthest valid ending instruction is detected; c) terminating the examining for a forward jump or a valid ending instruction when the instruction under examination is beyond the instruction corresponding to the FLR Pointer; and d) resolving each unresolved reference in each instruction of the at least one method body starting with the first instruction of the at least one method body and ending with the instruction corresponding to the FLR Pointer.

28. The smart card of claim 27 further having logic operable to cause the processor to determine instruction boundaries within the computer code by d) setting a Start Pointer to a next method body of the at least one method body following the instruction corresponding to the FLR Pointer.

29. The smart card of claim 28 wherein each of the steps a), b), c), and d) are performed on each of a successive method bodies of the at least one method body.

30. The smart card of claim 29 further having logic operable to cause the processor to determine instruction boundaries within the computer code by e) setting a Start Pointer to a next method body of the at least one method body following the instruction corresponding to the FLR Pointer.

31. The smart card of claim 30 wherein each of the steps a), b), c), d), and e) are performed on each of a successive meted bodies of the at least one method body.

32. The smart card of claim 27 further having logic operable to cause the processor to determine instruction boundaries within the computer code by d) determining if an exception handler code corresponding to the at least one method body is present; and e) responsive to determining that an exception handler code corresponding to the at least one method body is present beyond the instruction corresponding to the FLR Pointer: (i) examining in a sequential manner each instruction of the exception handler code corresponding to the at least one method body starting with a first instruction of the exception handler code corresponding to the at least one method body for an instruction selected from a group consisting of a forward jump instruction and a valid ending instruction; (ii) maintaining a FLR Pointer corresponding to the exception handler code corresponding to the at least one method body for which the farthest forward jump or the farthest valid ending instruction is detected; and (iii) terminating the examining for a forward jump or a valid ending instruction when the instruction under examination is beyond the instruction corresponding to the FLR Pointer.

33. The smart card of claim 32 further having logic operable to cause the processor to determine instruction boundaries within the computer code by f) setting a Start Pointer to a next method body of the at least one method body following the instruction corresponding to the FLR Pointer.

34. The smart card of claim 33 wherein each of the steps a), b), c), d), e), and f) are performed on each of a successive method bodies of the at least one method body.

35. The smart card of claim 32 further having logic operable to resolve unresolved reference in the exception handler code corresponding to the at least one method body by f) resolving each unresolved reference in each instruction of the exception handler code corresponding to the at least one method body starting with the first instruction of the exception handler code corresponding to the at least one method body and ending with the instruction corresponding to the FLR Pointer.

36. The smart card of claim 35 further having logic operable to cause the processor to determine instruction boundaries within the computer code by g) setting a Start Pointer to a next method body of the at least one method body following the instruction corresponding to the FLR Pointer.

37. The smart card of claim 36 wherein each of the steps a), b), c), d), e), f), and g) are performed on each of a successive method bodies of the at least one method body.

38. The smart card of claim 32 further having logic operable to cause the processor to determine if an exception handler code corresponding to the at least one method body is present by (i) determining if an exception entry is available in an exception handler array corresponding to the computer code; (ii) responsive to determining that an exception entry is available, determining a catch range for the exception entry; and (iii) determining if any of the instructions of the at least one method body starting with the first instruction of the at least one method body and ending with the instruction corresponding to the FLR Pointer are within the catch range.

39. The smart card of claim 27 wherein the computer code comprises a methods items of a method component of a converted applet file.

40. The smart card of claim 27 wherein the memory comprises non-volatile read/write memory.

41. A method for determining instruction boundaries of at least one method body within a computer code loaded into a memory of a smart card comprising:
    a) examining the instructions of the at least one method body to determine a farthest logical return within the at least one method body;
    b) establishing the instruction boundary at the instruction located at the farthest logical return;
    c) terminating the examination of the instructions when the instruction under examination is beyond the farthest logical return; and
    d) resolving each unresolved reference in each instruction of the at least one method body starting with the first instruction of the at least one method body and ending with the instruction corresponding to the farthest logical return.

42. The method of claim 41 wherein the examining step (a) includes examining for an instruction selected from a group consisting of a forward jump instruction and a valid ending instruction.

43. The method of claim 41 further comprising:
    d) setting a Start Pointer to a next method body of the at least one method body following the instruction corresponding to the farthest logical return.

44. The method of claim 43 wherein each of the steps a), b), c), and d) are performed on each of a successive method bodies of the at least one method body.

45. The method of claim 44 further comprising:
    a) setting a Start Pointer to a next method body of the at least one method body following the instruction corresponding to the farthest logical return.

46. The method of claim 45 wherein each of the steps a), b), c), d), and e) are performed on each of a successive method bodies of the at least one method body.

47. The method of claim 41 further comprising:
    d) determining if an exception handler code corresponding to the at least one method body is present; and
    e) responsive to determining that an exception handler code corresponding to the at least one method body is present beyond the instruction corresponding to the farthest logical return:
        (i) examining the instructions of the exception handler code corresponding to the at least one method body to determine a farthest logical return within the exception handler code corresponding to the at least one method body;
        (ii) establishing the instruction boundary at the instruction located at the farthest logical return within the exception handler code corresponding to the at least one method body; and
        (iii) terminating the examination of the instructions when the instruction under examination is beyond the farthest logical return within the exception handler code corresponding to the at least one method body.

48. The method of claim 47 wherein the examining step (e)(i) includes examining for an instruction selected from a group consisting of a forward jump instruction and a valid ending instruction.

49. The method of claim 47 further comprising:
    f) setting a Start Pointer to a next method body of the at least one method body following the instruction corresponding to the farthest logical return within the exception handler code corresponding to the at least one method body.

50. The method of claim 49 wherein each of the steps a), b), c), d), e), and f) are performed on each of a successive method bodies of the at least one method body.

51. The method of claim 47 further comprising:
f) resolving each unresolved reference in each instruction of the exception handler code corresponding to the at least one method body starting with the first instruction of the exception handler code corresponding to the at least one method body and ending with the instruction corresponding to the farthest logical return within the exception handler code corresponding to the at least one method body.

52. The method of claim 51 further comprising:
g) setting a Start Pointer to a next method body of the at least one method body following the instruction corresponding to the farthest logical return within the exception handler code corresponding to the at least one method body.

53. The method of claim 52 wherein each of the steps a), b), c), d), e), f), and g) are performed on each of a successive method bodies of the at least one method body.

54. The method of claim 47 wherein determining if an exception handler code corresponding to the at least one method body is present includes:
(i) determining if an exception entry is available in an exception handler array corresponding to the computer code;
(ii) responsive to determining that an exception entry is available, determining a catch range for the exception entry; and
(iii) determining if any of the instructions of the at least one method body starting with the first instruction of the at least one method body and ending with the instruction corresponding to the farthest logical return are within the catch range.

55. A smart card configured to receive computer code having at least one method body within the computer code comprising:
a memory;
a processor connected to the memory; and
an installer module having logic operable to cause the processor to receive the computer code into the memory; and further having logic operable to cause the processor to determine instruction boundaries within the computer code by a) examining the instructions of the at least one method body to determine a farthest logical return within the at least one method body; b) establishing the instruction boundary at the instruction located at the farthest logical return; c) terminating the examination of the instructions when the instruction under examination is beyond the farthest logical return; and d) resolving each unresolved reference in each instruction of the at least one method body starting with the first instruction of the at least one method body and ending with the instruction corresponding to the farthest logical return.

56. The smart card of claim 55 wherein the computer code comprises a methods item of a method component of a converted applet file.

57. The method of claim 41 wherein the memory comprises non-volatile read/write memory.

58. A method for determining instruction boundaries of at least one method body within a computer code loaded into a memory of a smart card comprising:
(a) examining in a sequential manner each instruction of the at least one method body starting with a first instruction of the at least one method body for an instruction that establishes a logical return;
(b) maintaining a Farthest Logical Return (FLR) Pointer to continuously store the farthest logical return found in the examining step (a);
(c) terminating examination of the instructions when an instruction under examination is beyond the instruction corresponding to the FLR; and
(d) resolving each unresolved reference in each instruction of the at least one method body starting with the first instruction of the at least one method body and ending with the instruction corresponding to the FLR Pointer.

59. The method of claim 58 wherein the examining for an instruction that establishes a logical return of step (a) includes examining for an instruction selected from a group consisting of a forward jump instruction and a valid ending instruction.

60. The method of claim 59 further comprising:
d) setting a Start Pointer to a next method body of the at least one method body following the instruction corresponding to the FLR Pointer.

61. The method of claim 60 wherein each of the steps a), b), c), and d) are performed on each of a successive method bodies of the at least one method body.

62. The method of claim 58 further comprising:
c) setting a Start Pointer to a next method body of the at least one method body following the instruction corresponding to the FLR Pointer.

63. The method of claim 62 wherein each of the steps a), b), c), d), and e) are performed on each of a successive method bodies of the at least one method body.

64. The method of claim 58 further comprising:
d) determining if an exception handler code corresponding to the at least one method body is present; and
a) responsive to determining that an exception handler code corresponding to the at least one method body is present beyond the instruction corresponding to the FLR Pointer:
(i) examining in a sequential manner each instruction of the exception handler code corresponding to the at least one method body starting with a first instruction of the exception handler code corresponding to the at least one method body for an instruction that establishes a logical return;
(ii) maintaining a FLR Pointer to continuously store the farthest logical return found in the examining step e(i);
(iii) terminating examination of the instructions when an instruction under examination is beyond the instruction corresponding to the FLR Pointer.

65. The method of claim 64 wherein the examining step (e)(i) includes examining for an instruction selected from a group consisting of a forward jump instruction and a valid ending instruction.

66. The method of claim 64 further comprising:
f) setting a Start Pointer to a next method body of the at least one method body following the instruction corresponding to the FLR Pointer.

67. The method of claim 66 wherein each of the steps a), b), c), d), e), and f) are performed on each of a successive method bodies of the at least one method body.

68. The method of claim 64 further comprising:
f) resolving each unresolved reference in each instruction of the exception handler code corresponding to the at least one method body starting with the first instruction of the exception handler code corresponding to the at least one method body and ending with the instruction corresponding to the FLR Pointer.

69. The method of claim 68 further comprising:
g) setting a Start Pointer to a next method body of the at least one method body following the instruction corresponding to the FLR Pointer.

70. The method of claim 69 wherein each of the steps a), b), c), d), e), f), and g) are performed on each of a successive method bodies of the at least one method body.

71. The method of claim 64 wherein determining if an exception handler code corresponding to the at least one method body is present includes:
(i) determining if an exception entry is available in an exception handler array corresponding to the computer code;
(ii) responsive to determining that an exception entry is available, determining a catch range for the exception entry; and
(iii) determining if any of the instructions of the at least one method body starting with the first instruction of the at least one method body and ending with the instruction corresponding to the FLR Pointer are within the catch range.

72. A smart card configured to receive computer code having at least one method body within the computer code comprising:
a memory;
a processor connected to the memory; and
an installer module having logic operable to cause the processor to receive the computer code into the memory; and further having logic operable to cause the processor to determine instruction boundaries within the computer code by a) examining in a sequential manner each instruction of the at least one method body starting with a first instruction of the at least one method body for an instruction that establishes a logical return; b) maintaining a Farthest Logical Return (FLR) Pointer to continuously store the farthest logical return found in the examining step (a); c) terminating examination of the instructions when an instruction under examination is beyond the instruction corresponding to the FLR Pointer; and d) resolving each unresolved reference in each instruction of the at least one method body starting with the first instruction of the at least one method body and ending with the instruction corresponding to the FLR Pointer.

73. The smart card of claim 72 wherein the computer code comprises a methods item of a method component of a converted applet file.

74. The method of claim 72 wherein the memory comprises non-volatile read/write memory.

* * * * *